United States Patent [19]

Inman et al.

[11] Patent Number: 5,628,168
[45] Date of Patent: *May 13, 1997

[54] BALE BAGGING MACHINE

[75] Inventors: Larry R. Inman; Michael H. Koskela, both of Astoria, Oreg.

[73] Assignee: Ag-Bag International Limited, Warrenton, Oreg.

[*] Notice: The term of this patent shall not extend beyond the expiration date of Pat. No. 5,398,487.

[21] Appl. No.: 371,806

[22] Filed: Jan. 11, 1995

Related U.S. Application Data

[63] Continuation-in-part of Ser. No. 157,404, Nov. 26, 1993, Pat. No. 5,398,487, and Ser. No. 212,244, Mar. 14, 1994, abandoned.

[51] Int. Cl.$^6$ ........................................... B65B 9/10
[52] U.S. Cl. ........................... 53/567; 53/575; 53/576
[58] Field of Search ..................... 53/527, 529, 530, 53/556, 567, 575, 576, 585

[56] References Cited

U.S. PATENT DOCUMENTS

| | | |
|---|---|---|
| 3,548,567 | 12/1970 | Manetta . |
| 4,165,595 | 8/1979 | Pilley . |
| 4,590,748 | 5/1986 | Harrison . |
| 4,653,553 | 3/1987 | Cox . |
| 4,686,817 | 8/1987 | Brodrecht et al. ............ 53/567 |
| 4,771,510 | 9/1988 | Kawai . |
| 4,888,937 | 12/1989 | Glenn . |
| 4,938,006 | 7/1990 | Korsgaard . |
| 4,945,715 | 8/1990 | Brodrecht ..................... 53/567 |
| 5,125,218 | 6/1992 | Smith-Gander . |
| 5,220,772 | 6/1993 | Koskela et al. ................ 53/567 |
| 5,385,002 | 1/1995 | Cundall ......................... 53/567 |
| 5,398,487 | 3/1995 | Inman et al. .................. 53/567 |
| 5,425,221 | 6/1995 | Pronovost et al. ............. 53/567 |

OTHER PUBLICATIONS

PCT/GB90/01820 Cundall Pub. #WO 91/07867 Jun. 13, 1991.

*Primary Examiner*—John Sipos
*Assistant Examiner*—Ed Tolan
*Attorney, Agent, or Firm*—Robert L. Harrington

[57] ABSTRACT

A machine for sheathing bales of material, such as farm crop products and/or organic material, into an elongate elastic bag. The machine is a portable unit and has radially adjustable fin like paddles that define a bale receiving opening. An opened ended bag into which the bales are to be sheathed is placed in a folded or bunched up condition on the paddles. A portion of the bag is pulled off the paddles and tied to define a closed end and the paddles are moved radially outward to enlarge the bale receiving opening and thereby stretch the bag. The machine has a cradle for receiving bales to be sheathed, and a bale pusher pushes the bale along the cradle through the bale receiving opening into the bag. The cradle is arranged to accommodate bales having either a circular or rectangular cross section. The bale pusher has a low profile to facilitate loading bales onto the cradle from the front and either side of the machine. The pusher is extendable to facilitate pushing the last bale through the machine. The bales as they exit the machine and are deposited on the ground are encased in the bag. The bag being elastic conforms closely to the shape of the bale. The machine may be powered by a self contained power unit or from a remote power source. A remote control power unit and remote control permit operating the machine unattended from a remote source.

7 Claims, 13 Drawing Sheets

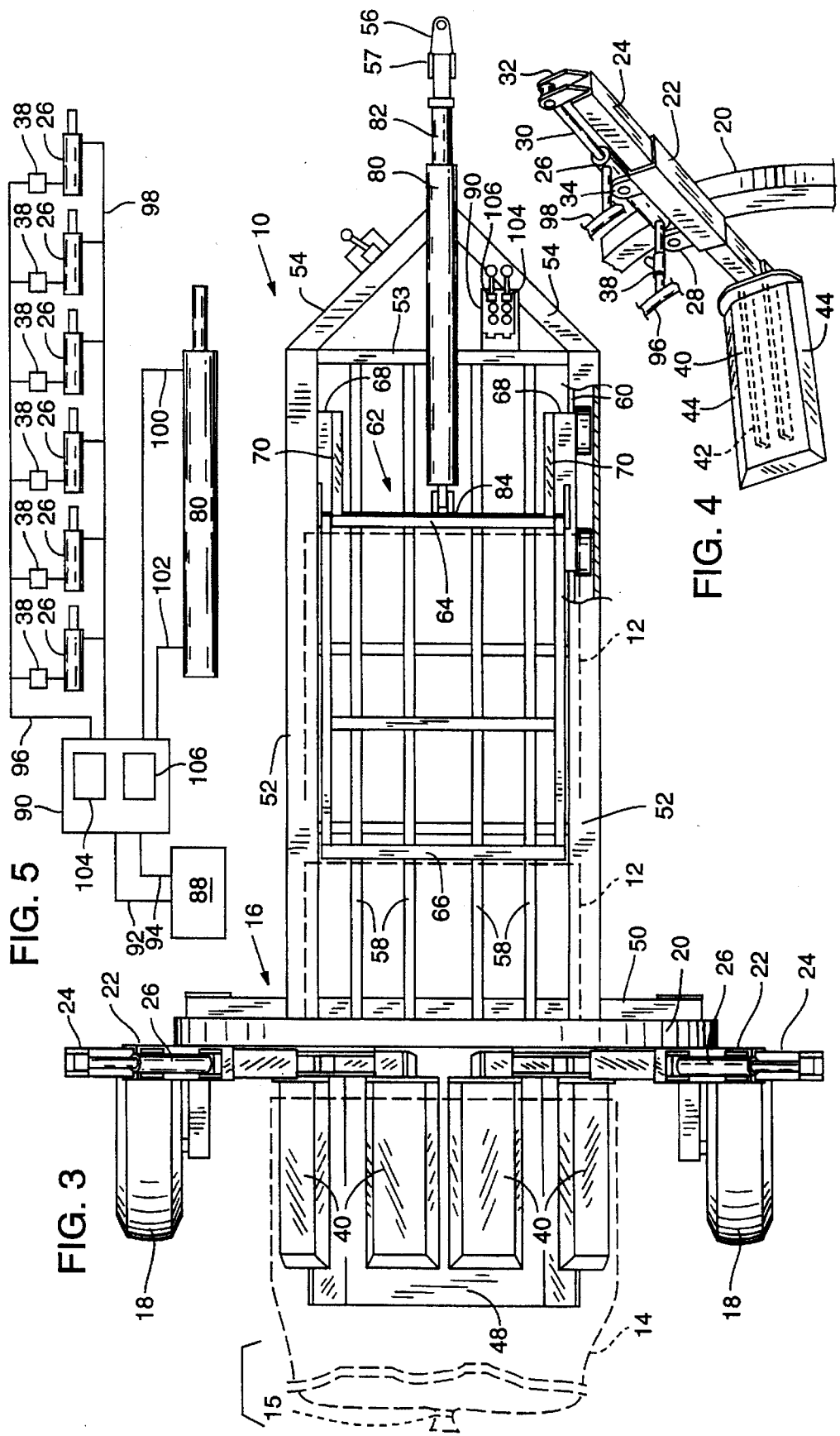

BALE BAGGING MACHINE

This application is a continuation-in-part of application Ser. No. 08/157,404 now U.S. Pat. No. 5,398,487 filed Nov. 26, 1993 titled BALE BAGGING MACHINE and of application Ser. No. 08/212,244 abandoned Jan. 23, 1995 filed Mar. 14, 1994 titled BALE BAGGING.

FIELD OF THE INVENTION

This invention relates to a bale bagging machine and more particularly to a machine having bag holding fingers that can be selectively configured to accommodate different bale configurations and a bale receiving cradle that will accommodate bales having varying cross sections.

BACKGROUND OF THE INVENTION

The concept of inserting large hay bales into plastic bags is disclosed in U.S. Pat. No. 4,606,176. Large bales weighing many hundreds of pounds, e.g., 2,000 lbs., are laid end to end and the bagging machine carrying a folded plastic bag is driven over the bales and in the process, the bales are deposited in the bag. An improvement to the above machine is disclosed in U.S. Pat. No. 5,220,722. It is desirable that the bag fit snugly to the bales. This latter invention provides an elastic bag which is stretched open by expandable fingers. The bales are directed through the bag opening (held open by the fingers) and in the process of being redeposited on the ground, the bag is pulled off the fingers to contract around the bales.

Whereas the concept as generally described is presently being marketed, it has been found that the bag filling process is not without some problems. The fingers which are cylindrical bars are provided at about six positions around a circle. With the bag stretched around the fingers, the bag opening assumes the shape of a polygon. A bale that is circular in cross section has a curved peripheral surface and unless enough tolerance is provided, the bale can occasionally snag and tear the bag.

Also, whereas the bales as contemplated for bagging by prior bagging machines are considered to be round in shape (having, e.g, a 4 foot to 6 foot diameter), the expandable fingers of the prior machines are arranged on the periphery of a circle which is considered optimal for receiving the round bales. (Here it will be explained that the fingers move in and out to fit different sizes of bales but regardless of the desired size established, the fingers are essentially located on the periphery of a circle.) The problem is that the bales are not necessarily and most likely are not truly round. The longer a circular bale lies on the ground, the more misshapen it becomes simply due to the weight of the bale. The bale settles and spreads and it becomes shorter and wider with a flat bottom and a flattened but curved top. It is an irregular shape and the more severe cases can be a problem for bag filling machines. Bales that are square or rectangular in cross section generally do not become misshapen by sitting on the ground. The prior machines, however, are not particularly suited to bagging square or rectangular bales. In many cases the bag must be stretched unduly to permit entry of the square or rectangular bale into the polygon shape of the stretched bag.

BRIEF SUMMARY OF THE INVENTION

The present invention at least in part is directed to a modification of the bag holding/expandable fingers to resolve the problems described. As in prior devices, the preferred embodiment of the present invention includes an oversized ring or ring-like support. (Here ring or ring-like support means a support frame that surrounds an opening and need not be circular.) The cylindrical rods referred to as expandable fingers in the prior devices are replaced with curved fins referred to as paddles, i.e., they are narrow in thickness but they are much wider than the prior fingers so as to provide more surface area for supporting a bag. The arrangement of the present invention also reduced the number of paddles to accommodate the greater width of each paddle and to more readily accommodate the various cross sections to be inserted into the bag.

The cylinders that move the fins radially are controlled by a valve arrangement that allows simultaneous or selective radial movement of the fins. The configuration of the opening defined by the fins can therefore be varied to accommodate different shapes of bales. Furthermore, it may be desirable to reshape the bale so as to conform a particularly misshapen circular bale to the shape of other bales being bagged. Certain of the cylinders can be isolated by the valve arrangement to produce sufficient hydraulic pressure to force a rounding of the bale.

Other features include a bale mover that pushes the bales into the bag, i.e., the bales are individually loaded on a platform (cradle) in front of the bag and then pushed into the bag. The cradle is configured to receive bales having a circular or rectangular cross section and the bale mover (pusher) has a low profile to facilitate loading bales into the cradle from either side or the front of the machine. An alternative embodiment provides a pattern of fingers that can be selectively operated for round bale or square bale bagging. A further embodiment is designed specifically for multiple square bale bagging.

A remote control may be utilized to control the movement of the bale mover so that bales may be inserted into the bag without attendance of an individual.

These and other features of the invention will be appreciated upon reference to the detailed description and drawings referred to therein.

DESCRIPTION OF THE DRAWINGS

FIG. 3 is a top plan view as taken on view lines 3—3 of FIG. 1;

FIG. 4 is a perspective view illustrating an expandable paddle as used on the bagging machine of FIG. 1;

FIG. 5 is a diagram of the hydraulic circuitry used in the operation of bale bagging machine of FIG. 1;

DESCRIPTION OF THE PREFERRED EMBODIMENT

Figure 1:
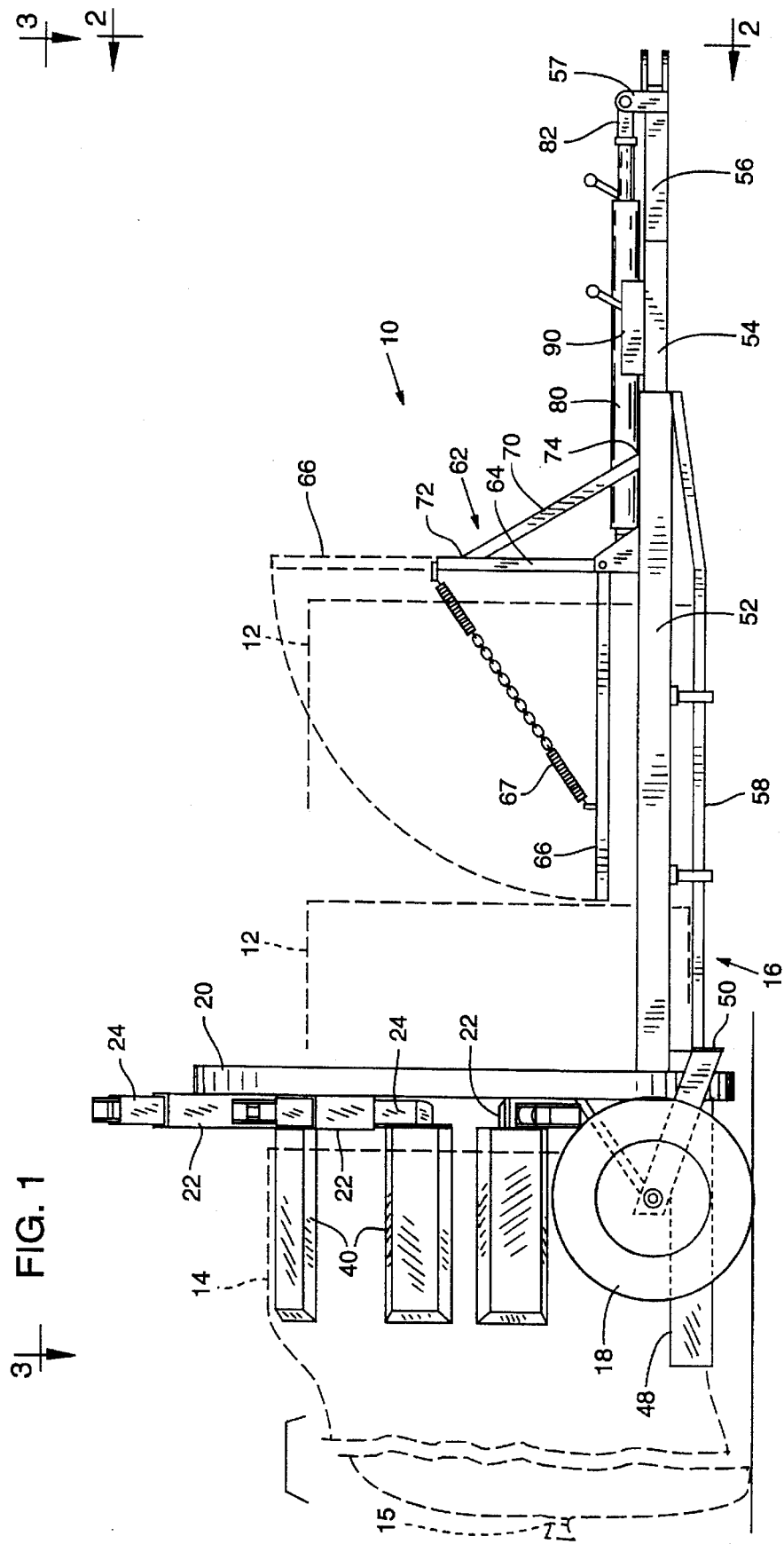
FIG. 1 is a side view of a bale bagging machine in accordance with the present invention.
Figure 2:
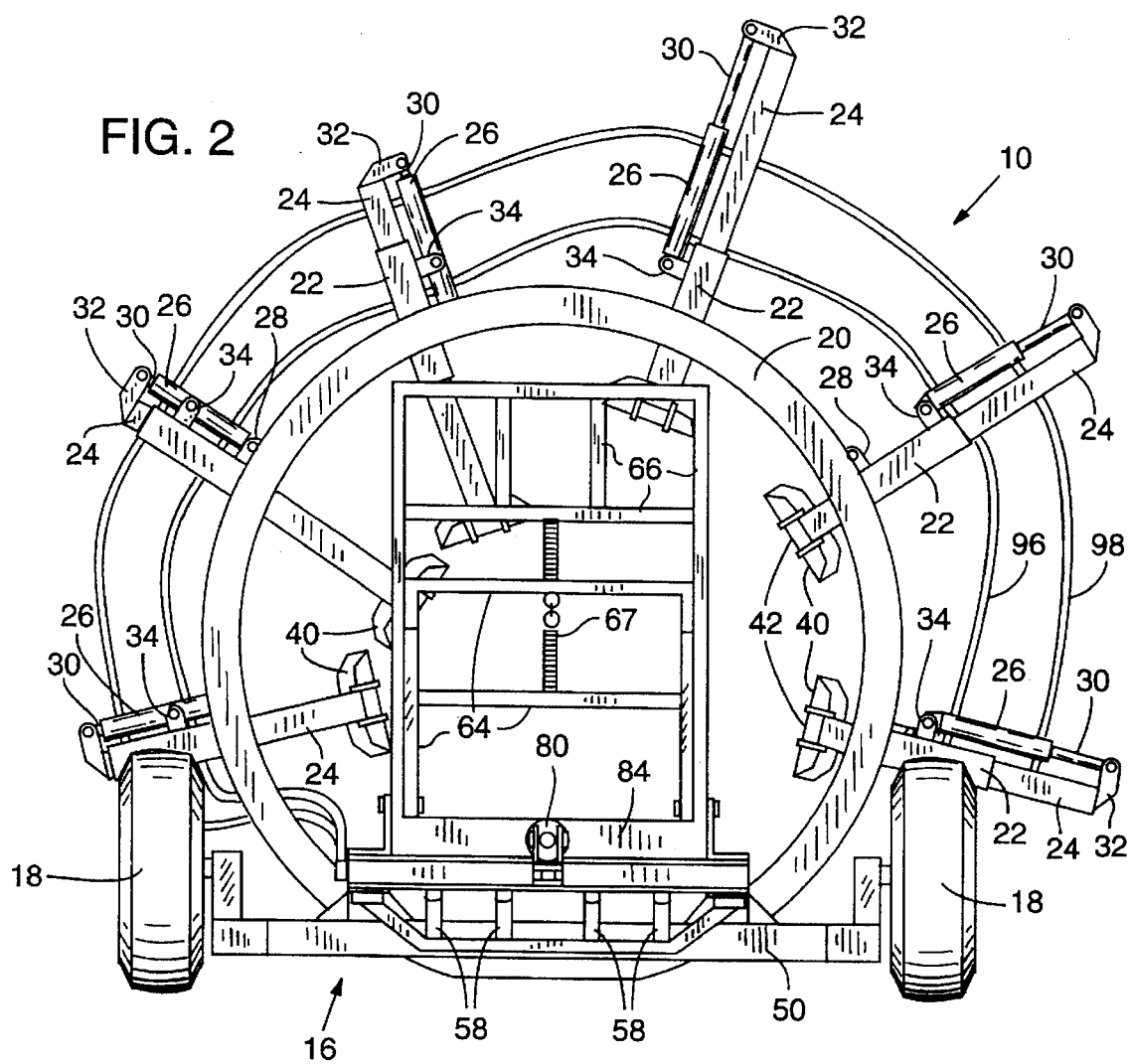
FIG. 2 is an end view as taken on view lines 2—2 of FIG. 1.

Refer now to FIGS. 1, 2 and 3 of the drawings which illustrate a bale bagging machine 10 of the present invention. The machine 10, as will later be explained, is arranged to insert multiple bales 12 into an elongate elastic sheath, such as a bag 14. The machine 10 has a chassis 16 for supporting the components and has wheels 18 to facilitate transporting the machine 10. A supporting member 20, which in this embodiment is circular and defines an opening through which the bales 12 will be fed, is fixedly attached to the chassis 16 as by welding. Sleeves 22 are strategically fixedly mounted to the support member 20 as by welding and are configured to receive support arms 24. It will be appreciated that the sleeves 22 may also be fixedly attached to the support member by removable fasteners, such as bolts. The sleeves 22 in this embodiment are elongate rectangular members having a rectangular opening sized to slidably receive rectangular support arms 24. The support arms 24 are slidably movable in the sleeves 22 by cylinders 26.

As seen in FIG. 2, the cylinders 26 are mountable to a bracket 28 or a bracket 34 extending from the sleeve 22 and an end of the cylinder rod 30 of the cylinder 26 is mounted to a bracket 32 extending from the outer end of the support arm 24. Brackets 28, 34 are sufficiently wide to permit the entry of the body of the cylinder 26. Brackets 28, 34 provide alternative mounting points for the cylinder 26 which is utilized to adapt the machine to a different size of bag 14 and thus a different size of bale 12. The support arms 24 are movable radially inward and outward with respect to the support member 20 by operation of the cylinders 26. The cylinders 26 are arranged to be movable in unison or independently. Valves 38 (shown in FIGS. 4 and 5) are provided for each of the cylinders 26 to isolate the cylinder from the hydraulic circuit. Fingers (paddle shaped fins, hereafter sometimes referred to as paddles) 40 are mounted on the end of the support arms 24 with the paddles 40 extending in a near normal attitude to the support arms 24. As shown in FIGS. 1 and 3, the paddles 40 extend rearwardly from the support member 20. The paddles 40 as best seen in FIG. 4 are preferably formed with a slight curvature and have beveled edges 44 formed along the extended end and the sides of the paddle. Support ribs 42 extending from the support arm 24 and attached to the underside of the paddle 40 are provided for additional strength and rigidity. The paddles 40 fixedly mounted to the support arms 24 are thus movable radially inward and outward with respect to the support member 20 by the operation of the cylinders 26.

A bottom support plate 48 is fixedly mounted to a cross member 50 of the chassis 16 strategic to the mounting of the support member 20 to the chassis 16. The bottom support plate 48 extends rearwardly substantially the same distance as the paddles 40 extend from the support member 20. The paddles 40 in combination with the support plate 48 define a bale receiving opening. The paddles 40 moved radially inward in effect contract the bale receiving opening and the paddles 40 moved radially outward enlarge the bale receiving opening.

The chassis 16 forward of the support member 20, that is on the side opposite of the mounting of the support plate 48 and the paddles 40, is arranged to receive a bale 12 to be sheathed. The chassis 16 has side frame members 52 extending forward of the cross member 50 substantially parallel to each other and in a space relation. The side frame members 52 are basically U-type channels that have the openings 60 of the U facing each other. Frame members 54 extend from the side frame members 52 to a center hitch member 56. A cross frame member 53 extends between the side frame members 52 at the juncture of the side frame members 52 with frame members 54. Center supports 58 are provided between the side frame members 52. One end of each of the center supports 58 is fixedly joined to the support plate 48 and the opposite ends are joined to the cross frame member 53. The side frame members 52 and the center supports 58 in combination form a cradle (platform) for receiving a bale 12 to be sheathed.

A bale pusher 62 is provided on the chassis 16 strategic to the defined cradle. The pusher 62 has an upright lower rectangular frame 64 and an upper rectangular frame 66. The lower end of the frame 64 is fixedly mounted to guide rails 68 slidably mounted in the side frame members 52. The side openings 60 (see FIG. 3) of the frame members 52 facilitate the slidable mounting of the guide rails 68 in the frame members 52. Bracing members 70 attached to frame 64 at 72 and to the guide rails 68 at 74 are provided for added strength and rigidity. The upper frame 66 is hinged to the lower frame 64 and may be pivoted downward as shown in FIG. 1 to extend toward the support member 20 substantially normal to the lower frame 64 and is maintained in position by a spring and chain 67. The upper frame 66 is hinged to pivot toward the support member 20 and in effect extends the reach of the pusher 62. The pusher 62 is slidably movable by a cylinder 80. An end of the cylinder 80 is pivotally attached to a cross member 84 of the lower frame 64. The cylinder rod 82 of the cylinder 80 is pivotally attached to the hitch member 56 on a bracket 57. The pusher 62 is slidably movable toward and away from the support member 20 by extension and retraction of the cylinder rod 82 of the cylinder 80.

Figure 1A:
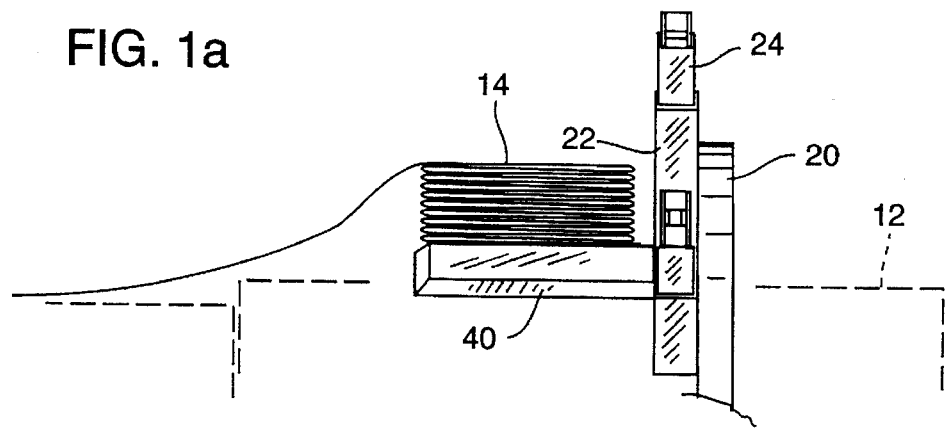
FIG. 1a is an enlarged partial view illustrating a bag mounted on the fingers of the device of FIG. 1.

FIG. 2 illustrates the arrangement of the paddles 40 in relation to the support member 20 and the alternative mounting arrangements of the cylinders 26 on the sleeves 22. The left side of the machine (as viewed in the figures) has the cylinders mounted on the sleeves 22 in brackets 28. This is the arrangement for the small diameter bales 12 and thus the small diameter bag 14 suited for sheathing the small diameter bales 12. The cylinders 26 when mounted on brackets 28 will position the arms 24 and thus the paddles 40 closer to the center of the support member 20. The paddles 40 are moved radially inward by operation of the cylinders 26 to facilitate placing a bag 14 on the paddles 40 and the lower support plate 48. The bag 14 is folded in a serpentine manner whereby the successive folds are laid over the underlying folds as illustrated in FIG. 1a. The prior gathered arrangement is illustrated in U.S. Pat. No. 4,606,176. The folded arrangement allows the overlying folds to more easily slide off the fingers and avoids the direct rubbing of the bag material on the fingers. Whereas previously the fingers were highly polished steel to minimize this wearing, the cost thereof is eliminated with the folded arrangement of FIG. 1a. The folded bag is then placed on the paddles 40 and the support plate 48 with the bag 14 encircling the paddles 40 and the support plate 48 as shown in FIGS. 1 and 3. The paddles 40 are moved radially outward by operation of the cylinders 26 to expand the defined bale receiving opening of the machine 10 and to stretch the opening of the bag 14. The large surface area of the paddles 40 in contact with the inner surface of the bag 14 provides for a more uniform stretching of the bag 14. The bag 14 is preferably of a resilient plastic material that will assume its original dimensions when the stretching forces are removed.

Refer now to FIGS. 1 and 3 of the drawings which illustrates the machine 10 with a bag 14 fitted to the paddles 40 and the support plate 48. The machine 10 is shown in the process of inserting bales 12 into the bag 14. Initially a sufficient portion of the bag 14 is pulled off the paddles to facilitate gathering and tying or otherwise fastening the bag end to define a closed end 15 of the bag 14. The paddles 40 are then extended radially outward by operation of the cylinders 26 to expand the defined bale receiving opening of the machine 10 and to stretch (expand) the opening of the bag 14. A bale to be sheathed is placed on the platform (cradle) of the machine 10. The pusher 62, by operation of the cylinder 80, forces the bale 12 through the opening of the support member 20 into the bale receiving opening defined by the position of the paddles 40 in combination with the lower support plate 48. The bale 12, as it is forced into and through the opening will be received within the bag 14 and as it continues through the opening will come into contact with the tied end 15 of the bag 14 and will pull a portion of the bag 14 off the paddles 40 and the lower plate 48. Another bale is placed on the platform and it is forced into the opening and into abutment with the first bale by operation of the pusher 62. The second bale 12 as it continues to move into the opening will force the first bale 12 to exit the machine 10 to be deposited on the ground. The first bale 12 is now encased in the bag 14 and the bag 14 will contract to its original dimension to conform closely to the size and shape of the bale 12. The first bale deposited on the ground within the bag 14 acts as an anchor. As the second and succeeding bales 12 are forced through the machine 10 and into the bag 14, the machine 10 will be urged to move forward by the pusher 62 applying a force onto the bales 12. The towing unit to which the machine 10 is hitched is utilized to provide the necessary braking force if required.

The process continues until all of the bales 12 have been sheathed in the bag 14 or the capacity of the bag 14 has been reached. When the last bale 12 to be inserted into the bag has been forced into the entry of the opening, the pusher 62 is retracted and the upper frame 66 of the pusher 62 is tilted forward. The upper frame 66 being tilted downward provides the pusher 62 with sufficient reach to force the last bale through the machine to be deposited on the ground when the pusher 62 is again advanced. The end of the bag 14 adjacent the last bale is then tied off to provide an air tight enclosure for the bales 12.

Refer now to FIG. 5 of the drawings which illustrates in block diagram the hydraulic circuit of the machine 10. A power source, such as a hydraulic pump, is provided to supply the motive power to move the motors (cylinders) of the machine 10. Tractors are most often utilized as the towing unit and most tractors of today have their own hydraulic pumps, reservoirs and controls valves. In this embodiment, control valves are provided on the machine 10 to control the operation of the cylinders.

As shown in the diagram of FIG. 5, a pump and reservoir unit 88 is connected to a valve body 90 by hydraulic lines 92 and 94. The valve body 90 has two control valves; control valve 104 for controlling the operation of the cylinders (motors) 26 and control valve 106 for controlling the operation of the cylinder (motor) 80. Recall that the cylinders 26 move the paddles radially inward and outward with respect to the supporting member 20 and cylinder 80 moves the pusher 62 toward and away from the supporting member 20. Hydraulic line 96 connects the control valve 104 to the cylinders 26 via the shut off valves 38. When valve 104 is operated to supply positive hydraulic pressure and flow to line 96, the cylinders 26 (with the valves 38 opened) will be operated to move the paddles 40 radially outward. Line 98 serves as a return line for the hydraulic fluid. Any one or multiple cylinders 26 may be made selectively inoperative by closing a valve 38 associated with the cylinder 26. When the valve 104 is operated to supply positive hydraulic pressure and flow to line 98, the cylinders will be operated to move the paddles 40 radially inward. Hydraulic line 96 now serves as a return line. Once again any one of the cylinders 26 or multiple cylinders may be made selectively inoperative by closing an appropriate valve 38. Valve 106 controls the operation of the cylinder 80. When valve 106 is operated to supply positive hydraulic pressure and flow to line 100, the cylinder rod 82 of the cylinder will be retracted and thus the pusher 62 will be moved away from the supporting member 20. When valve 106 is operated to supply positive hydraulic pressure and flow to line 102, the cylinder rod 82 will be extended to move the pusher 62 toward the supporting member 20.

The cylinders 26 may be selectively mounted on either brackets 28 or 34 on the sleeve 22. This affords altering the opening of the bag 14 in the stretched condition and is beneficial for inserting misshapen bales 12 into the bag 14. Bales tend to settle and become misshapen after baling, particularly if the bales are loosely compacted during baling and the bales sit for a period of time prior to the bagging operation. The bales tend to assume a somewhat elliptical shape with a portion of the bale in contact with the ground becoming flattened. A user may for example mount the cylinders 26 controlling the lower paddles in the brackets 34 and have the balance of the cylinders mounted in brackets 28. This will allow the stretching of the bag into a shape somewhat like the misshapen bale, that is the lower paddles as they are moved radially outward will in combination with the balance of the paddles stretch the bag 14 into a shape somewhat like the misshapen bale.

Figure 2A:
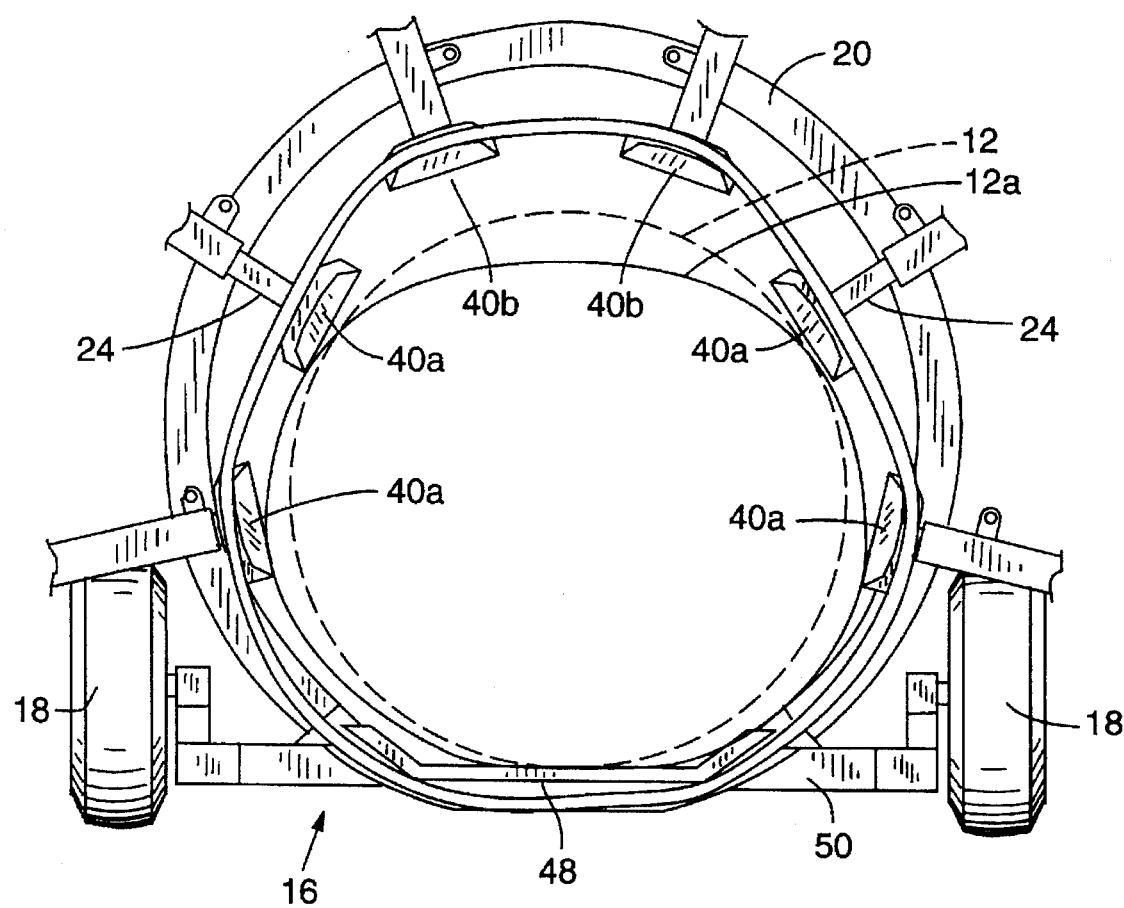
FIG. 2a is a schematic illustration illustrating the fingers/paddles being used to reshape a bale.

The paddles may also be utilized to reshape a bale so that it may be more readily inserted into the bag. This is schematically illustrated in FIG. 2a, e.g., compare the misshapen bale 12a with the more common circular bale 12 in dash lines. Considering the example of the illustrated misshapen bale 12a, the paddles 40a are moved radially outward and the pusher 62 forces the bale into a position where the paddles 40a are forced up against each side of the bale. The upper paddles 40b may be isolated from motion by closing the valves 38 associated with each corresponding cylinder 26 of paddles 40b. The lower paddles 40a are then moved inward to force the bale into a shape suitable for insertion into the bag 14. Other combinations are possible by simply altering the mounting of the appropriate cylinders 26 and isolating the appropriate cylinders 26 by the valves 38.

Figure 6:
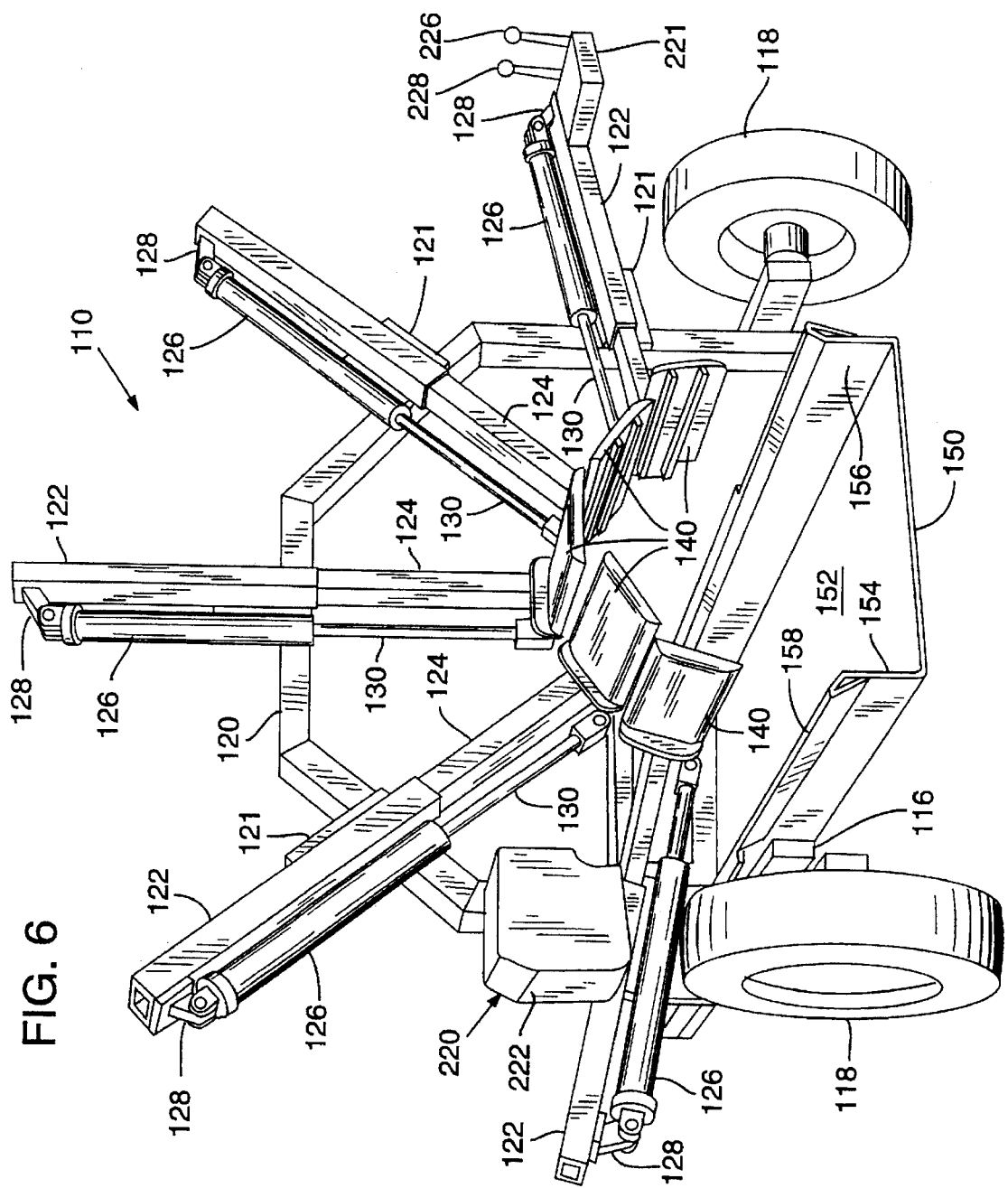
FIG. 6 is a perspective view of another embodiment of a bagging machine of the present invention.
Figure 7:
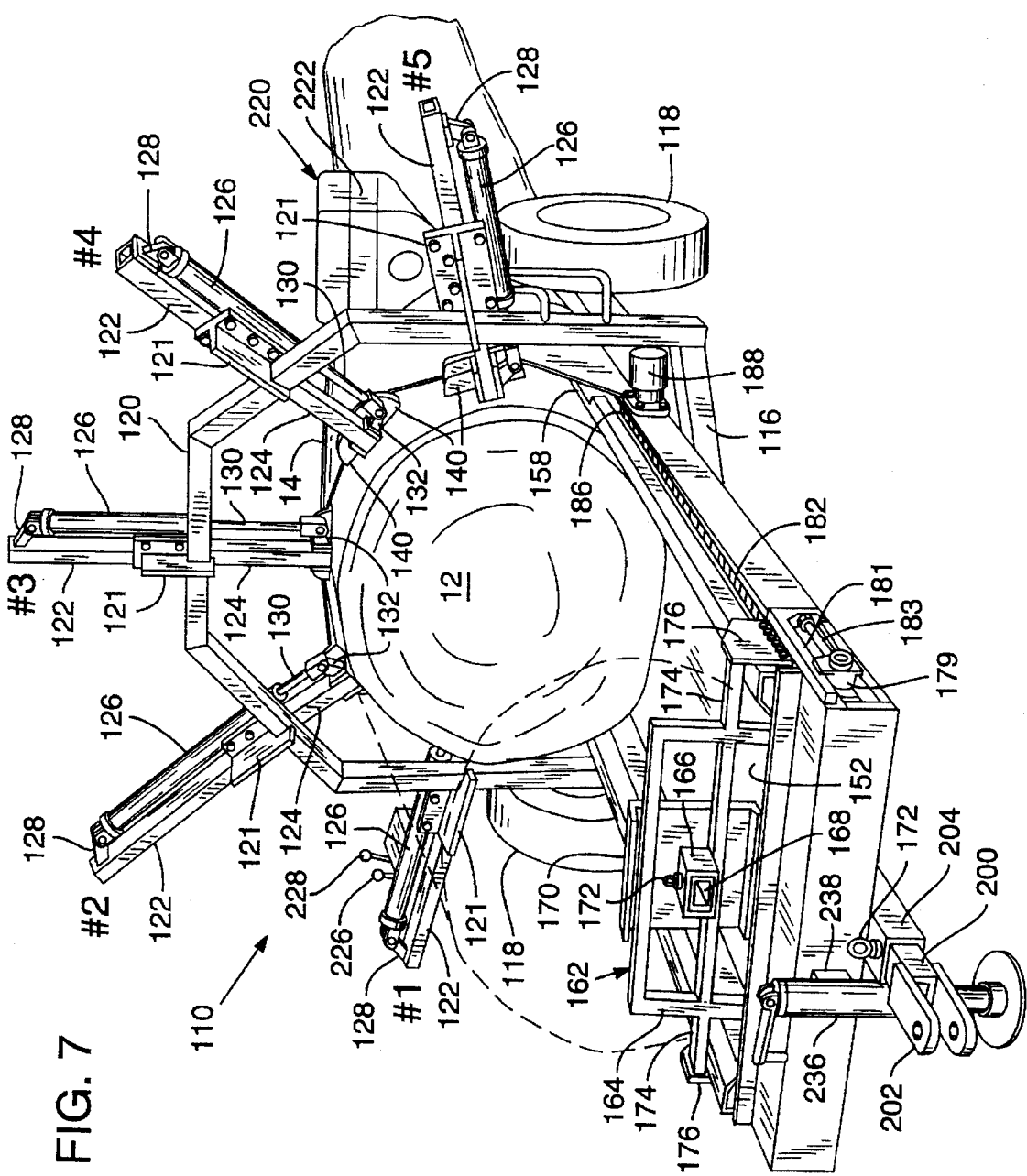
FIG. 7 is perspective view of the machine of FIG. 6 as viewed from another angle illustrating bales being bagged.
Figure 8:
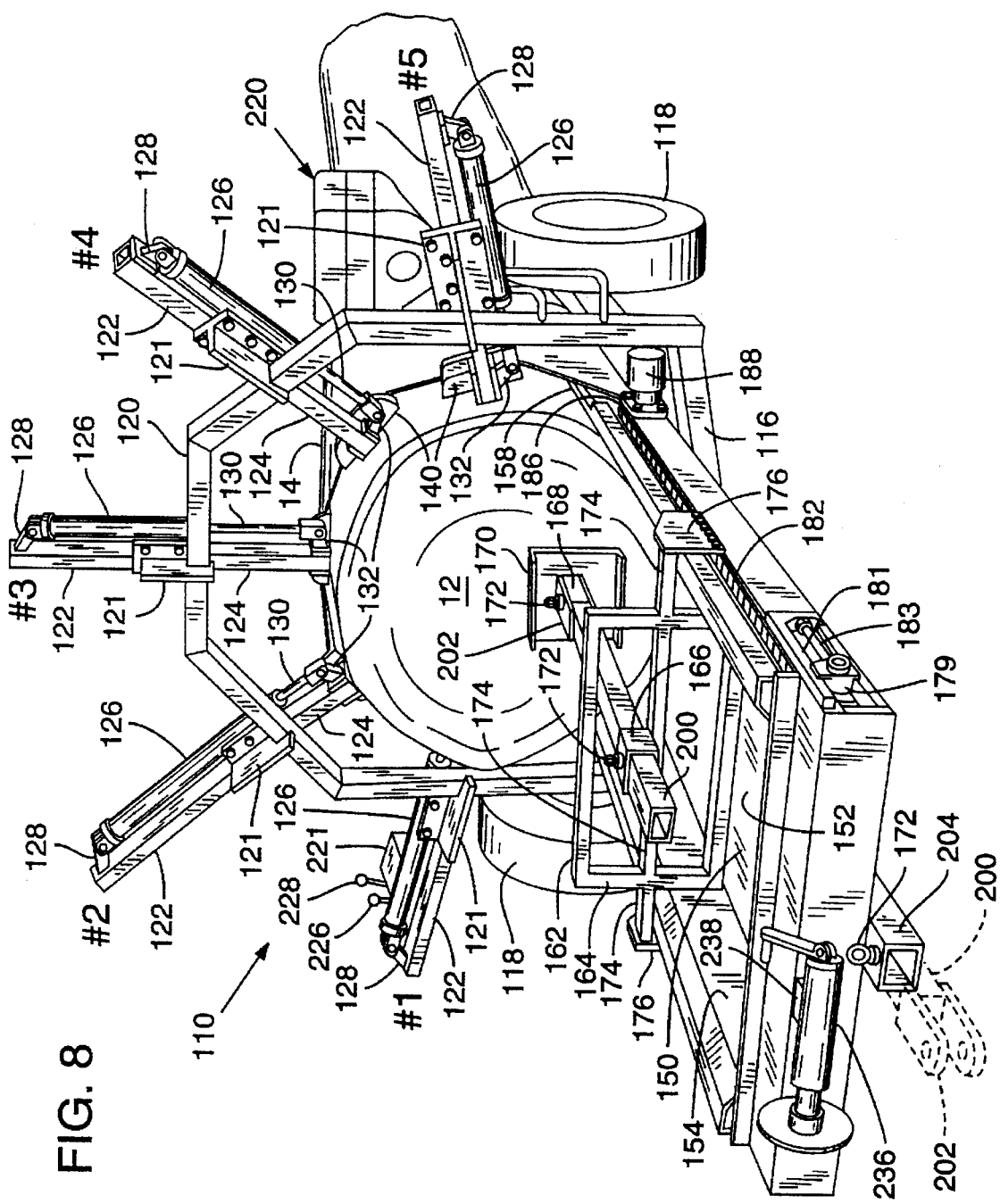
FIG. 8 is a perspective view similar to FIG. 7 illustrating the arrangement for inserting the last bale into the bag.
Figure 9:
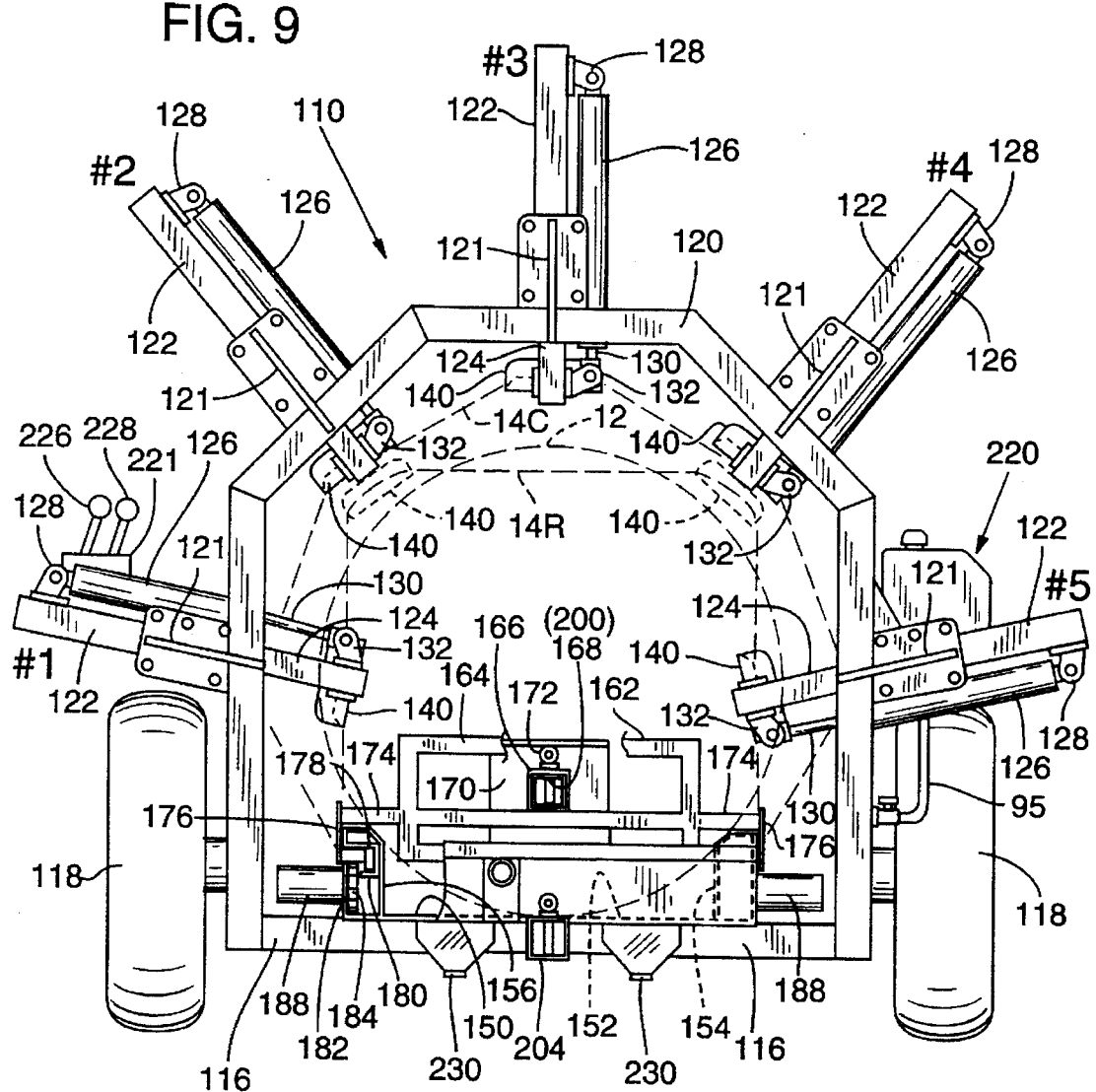
FIG. 9 is an end view of the machine of FIG. 6 showing the arrangement for bagging bales having different cross sections.

Refer now to FIGS. 6, 7 and 8 of the drawings which illustrate an alternate embodiment of a bale bagging machine designated by the numeral 110. The machine 110 has a chassis 116 on which the components of the machine 110 are mounted. Wheels 118 are mounted to the chassis for transport and mobility. In this embodiment, a hexagonal shaped vertical support member 120 extends upward from the chassis 116 and has brackets 121 mounted and positioned at strategic positions as shown in the figures. Attached to the brackets 121, as by bolting, are sleeves 122. The support member 120 surrounds and defines an opening through which the bales will pass during the bale sheathing (bagging) operation. Slidably mounted in each of the sleeves 122 are support arms 124. The support arms 124 are slidably movable in the sleeves 122 by cylinders 126. An end of the cylinder 126 is connected to the support arm 124 on a bracket 128 and the end of the cylinder rod 130 of the cylinder 126 is connected to the sleeve 122 on a bracket 132. Paddles 140 are mounted on the end of the support arm 124 in the same manner as the paddles 40 are mounted to the support arms 24 as illustrated in FIG. 4. The cylinders 126 will move the arms 124 and thus the paddles 140 in a radial-like direction toward and away from an axis through the center of the ring-like support member 120. FIG. 6 shows the paddles 140 moved radially inward and FIGS. 7, 8, and 9 show the paddles moved radially outward.

Mounted on the chassis 116 is a platform or cradle 150 for supporting and guiding bales 12 to be sheathed. As shown the cradle 150 has a substantially flat bottom 152 and upstanding sides 154, 156. The cradle 150 extends rearward through the defined opening of the support member 120 to about the position of the paddles 140. The rectangular arrangement of the cradle 150 facilitates receiving and guiding bales of both circular and rectangular cross section. A bale pusher 162 (best seen in FIGS. 7 & 8) is strategically movably mounted to push the bales 12 received on the cradle 150 into and through the opening defined by the paddles 140 and the base of the cradle 150. The pusher 162 has a frame 164 that fits in the cradle 150. The frame 164 has a socket 166 that receives a shank 168 of a pusher plate 170 (FIG. 7) with the shank 168 being retained in the socket 166 by a pin 172 fitting in alignable holes provided in the socket 166 and the shank 168. The pusher plate 170 (FIG. 7) is readily attached to the frame 164 by simply inserting the shank 168 into the socket 166 and inserting the pin 172 into the aligned holes. Similarly, the pusher plate 170 is removed by simply removing the pin 172 and removing the shank 168 from the socket 166. As seen in FIG. 9, side members 174 extend from the frame 164 and include a bracket 176 that is in sliding contact between supports 178, 180 formed on the cradle 150. The bracket 176, as the pusher 162 is moved, slides along between the supports 178, 180. Each bracket 176 is attached to a chain 182 (FIGS. 7 and 8) in a conventional manner. Each chain 182 is fitted to a conventional idler sprocket 184 and a drive sprocket 186. The idler sprockets 184 and the drive sprockets 186 are rotatably mounted in conventional bearings. The idler sprocket bearing assemblies 179 are movably mounted in a channel member 181 to provide chain tension adjustment. The bearing assemblies 179 are movable by a conventional threaded shaft and nut 183 fitted to the channel member 181. Each drive sprocket 186 is coupled to a motor, such as a hydraulic motor 188. The pusher 162 is thus movable along the cradle 150 toward and away from the vertical support member 120 by operation of the motors 188.

Refer to FIGS. 7 and 8. The chassis 116 includes a removable elongate tow bar 200. A clevis type hitch 202 is provided on one end of the tow bar 200. The tow bar 200 fits in a tubular member 204 of the chassis 116 to be utilized as a tow bar and is retained in position by a pin 172 fitting in alignable holes in the tow bar 200 and the member 204. The tow bar 200 is also utilized to extend the reach of the pusher 162. The pusher plate 170 is removed from the socket 166 of the frame 164 and the tow bar 200 is removed from the tubular member 204. The tow bar 200 is mounted in the socket 166 of the frame 164 as shown in FIG. 8 and is retained by pin 172. The shank 168 of the pusher plate 170 is fitted to the hitch 202 and is retained by a pin 172. The reach of the pusher 162 is thus extended which is utilized to force the last bale completely through the machine 110 as illustrated in FIG. 8.

Figure 10:
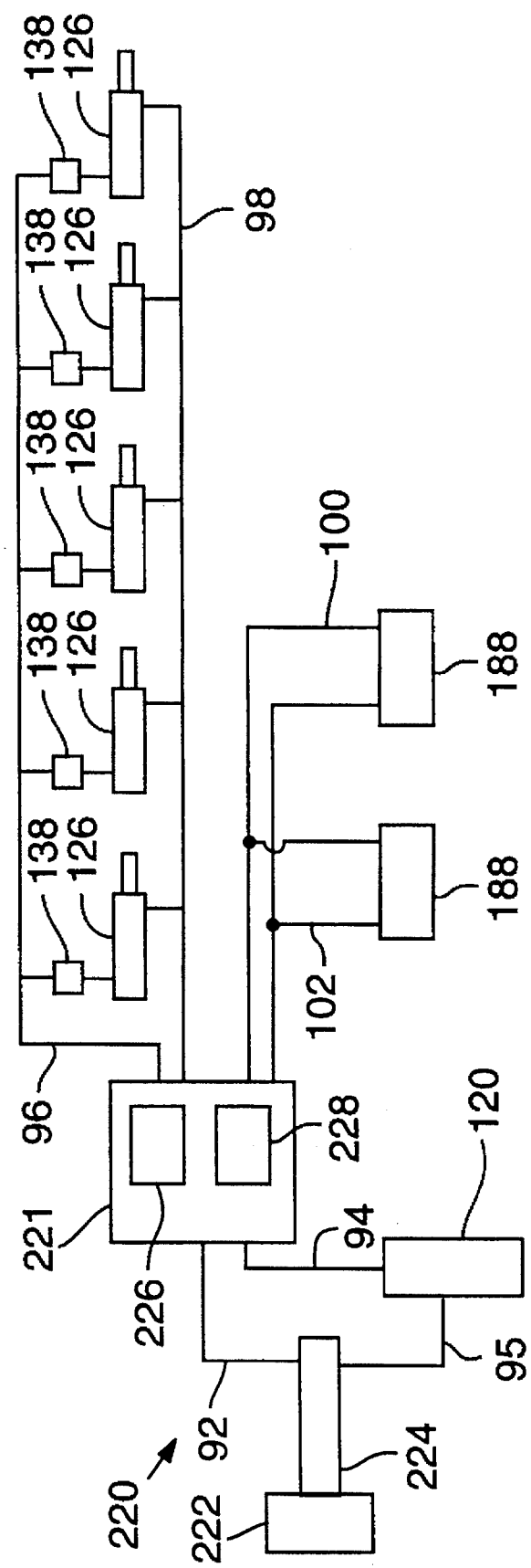
FIG. 10 is a diagram of the hydraulic circuitry used in the operation of the machine of FIG. 6.

In this embodiment, a self contained power unit 220 mounted on the machine 110 in a conventional manner provides the hydraulic (motive) power for the cylinders 126 and the motors 188. Referring also to FIG. 10, the power unit 220 includes a drive motor 222, a hydraulic pump 224 and valve body 221 with controls valves 226 and 228 as shown in the diagram of FIG. 10. Valve 226 is utilized to control the operation of the cylinders 126 and the valve 228 is utilized to control the operation of the motors 188. The vertical support member 120 is utilized as a fluid reservoir for the hydraulic fluid. Known conventional fluid conducting conduits are utilized to interconnect the components of the power unit 220 and each of the cylinders 126, motors 188 and the reservoir. The hydraulic lines and other equipment are not illustrated in FIGS. 6, 7, 8 and 9 since these are known and also for drawing clarity. FIG. 10 illustrates a hydraulic circuit diagram of the machine 110.

As stated, FIG. 10 illustrates a basic hydraulic circuit diagram for controlling the cylinders 126 and the motors 188. As shown, pump 224 of the power unit 220 is connected to the fluid reservoir provided in the support member 120 by a line 95 and to the valve body 221 by line 92. The valve 226 of the valve body 221 controls the flow of fluid to the cylinders 126 via lines 96 and 98. Hydraulic line 96 connects the control valve 226 to the cylinders 126 via the control valves or shut off valves 138. A valve 138 is provided for each cylinder 126 to isolate or make the cylinder selectively operative or inoperative depending on whether the valve 138 is opened or closed. A valve 138 is provided for each cylinder 126 in a manner similar to providing a valve 38 for each cylinder 26 as illustrated in FIG. 4. A valve 138 is provided for each cylinder 126 in a manner similar to the prior embodiment where valve 38 is provided for each cylinder 26 as illustrated in FIG. 4. When valve 226 is operated to supply positive hydraulic pressure and flow to line 96, the cylinders 126 (with the valves 138 opened) will be operated to move the paddles 140 radially inward. Line 98 serves as a return line for the hydraulic fluid. Any one or multiple cylinders 126 may be made selectively inoperative by closing a valve 138 associated with the cylinder 126. When the valve 226 is operated to supply positive hydraulic pressure and flow to line 98, the cylinders 126 will be operated to move the paddles 140 radially outward. Hydraulic line 96 now serves as a return line. Once again any one of the cylinders 126 or multiple cylinders may be made selectively inoperative by closing an appropriate valve 138.

Valve 228 controls the operation of the motors 188. When valve 228 is operated to supply positive hydraulic pressure and flow to line 100, the motors 188 are operated to propel the chain 182 to move the pusher 162 away from the supporting member 120. When valve 228 is operated to supply positive hydraulic pressure and flow to line 102, the motors 188 are operated to propel the chain 182 to move the pusher 162 toward the supporting member 120.

Line 94 connects the valve body 221 to the reservoir in the vertical support member 120 and is provided for the return flow of hydraulic fluid.

FIG. 9 illustrates the arrangement of the paddles 140 for both a circular bale and a rectangular bale. The paddle assemblies mounted to the vertical support are designated as #1, #2, #3, #4 and #5. The paddle assemblies include the sleeves 122 mounted to the brackets 121, the arms 124 slidably mounted in the sleeves 122, the cylinders 126 and the paddles 140 mounted on the arms 124. The paddles 140 in combination with the cradle 150, in particular the end 158 of the cradle 150 define an opening for receiving a bale (or bales) 12 to be sheathed.

An elastic bag 14 is fitted to encircle all five of the paddle assemblies and the end 158 of the cradle 150 for circular bales. The paddle assemblies are moved radially inward (as shown in FIG. 6) to facilitate mounting (fitting) the bag 14 on all the paddle assemblies and end 158 of the cradle 150. The bag 14 is preferably mounted in the folded condition as illustrated in FIG. 1a. As shown in FIGS. 7, 8 and 9, all of the paddle assemblies are retracted by operation of the cylinders 126 to move the paddles radially outward. The bag 14 stretched or enlarged to a cross section suited to receive circular bales 12 is designated in FIG. 9 as 14C. The cooperative movement of all the paddles 140 in conjunction with the end 158 of the cradle 150 will stretch the bag 14 to enlarge the opening of the bag 14 through which the circular bale 12 will be received by action of the pusher 162.

FIG. 9 also illustrates the arrangement of the paddles 140 to enlarge the opening of the bag 14 to accommodate rectangular bales. The paddle assembly designated as #3 is fully retracted (moved radially outward) and then the valve 138 is closed to isolate or make the cylinder 126 inoperative. The balance of the paddle assemblies are then moved radially inward to facilitate placing the folded bag 14 around the paddle assemblies designated as #1, #2, #4 and #5 and around the end 158 of the cradle 150. The paddle assemblies #1, #2, #4 and #5 are moved radially outward to enlarge (stretch) the opening of the bag 14 to a cross section suited for receiving bales having a rectangular cross section. The bag 14 fitted to the machine 110 arranged for sheathing rectangular bales is designated as 14R in FIG. 9.

The machine 110 is arranged to be operated without being connected to a towing unit such as a tractor. As seen in FIG. 9, the machine 110 is provided with tracking skids 230 on the underside of the chassis 116. The skids 230 maintain the machine 110 along a travel direction during the sheathing operation and additionally provide a braking force so that the machine 110 will not freely roll during the sheathing operation. The low profile of the pusher 162 and the sides of the cradle 150 permit loading a bale onto the cradle 150 from either side or the front (hitch end) of the machine.

The machine 110 includes a conventional jack 236 that is removably mountable to a post 238. Additionally the jack 236 may be rotated on the post 238 when not in use. The jack 236 is utilized to support and elevate the hitch end of the machine 110 (see FIG. 7) to facilitate connecting the machine 110 to and disconnecting the machine 110 from a towing unit. The jack 236 is also utilized to lower the hitch end of the machine 110 to the ground in order to commence with the sheathing operation. When the hitch end of machine 110 has been lowered to the ground, the jack 236 is removed (FIG. 9) or rotated (FIG. 8) so it will not be in contact with the ground and impede movement of the machine 110 during the sheathing operation.

Initially the hitch end of the machine is lowered to the ground by utilizing the jack 236 and the jack is either rotated on the post or removed. A bag 14 is fitted on the appropriate paddles and the end 158 of the cradle 150 according to the type of bale to be sheathed as has been detailed above. A short length of the bag is pulled off the machine 110 and is tied to form a closed end. The paddles (which the bag surrounds) are moved radially outward to enlarge (stretch) the opening of the bag 14.

The pusher 162 is retracted away from the vertical support member 120 and a bale is placed on the cradle 150 adjacent the pusher 162 by known handling equipment such as a front end loader. The figures illustrate a single bale 12 being placed on the cradle 150. It will be appreciated that multiple bales 12 may be stacked together to form a single bale unit. Control valve 228 is operated to move the pusher 162 toward the vertical support member 120. The pusher 162 will force the bale 12 (or bale unit) into the bale receiving opening defined by the bag engaging paddles 140 and the end 158 of the cradle 150 which have stretched the bag 14. The bag 14 which surrounds or encircles the engaging paddles 140 and the end 158 of the cradle 150 is the opening into which the bale (or bale unit) will enter. Hereafter the bale or the multiple bales making up a bale unit will be referred to as a bale 12 or simply bale.

The pusher 162 will continue to move the bale 12 toward the end 158 of the cradle 150. When the pusher has reached the end of its stroke, the pusher is retracted and another bale 12 is placed on the cradle 150. The pusher 162 is again advanced toward the vertical support 120 which forces the second bale into abutment with the first bale. The pusher will continue moving the second bale which forces the first bale through the defined opening into the bag 14 to exit the machine 110. As the first bale is exiting the machine 110, it will come in contact with the closed end of the bag 14 and a portion of the bag will be pulled off the end of the machine 110.

The first bale will be deposited on the ground within the bag 14. The first bale will now serve as an anchor and as additional bales are forced through the defined opening and into the bag 14 to exit the machine 110, the machine 110 will be forced to move away from the first and succeeding bales. The operation is continued until all the bales have been sheathed or the bag capacity has been reached.

The last bale to be sheathed is forced into the bag 14 by extending the reach of the pusher 162. The pusher 162 pushes the last bale onto the end 158 of the cradle 150 and is then retracted away from the vertical support member 120 and the last bale. As previously mentioned the tow bar 200 is mounted to the socket 166 of the pusher 162 and the pusher plate 170 is mounted to hitch end 202 of the tow bar 200 to extend the reach of the pusher 162. The pusher 162 is then advanced toward the vertical support member 120 and the last bale 12 is forced off the end 158 of the cradle 150 to be deposited on the ground. The end of the bag is then tied to form a closed end adjacent the last bale.

Figure 11:
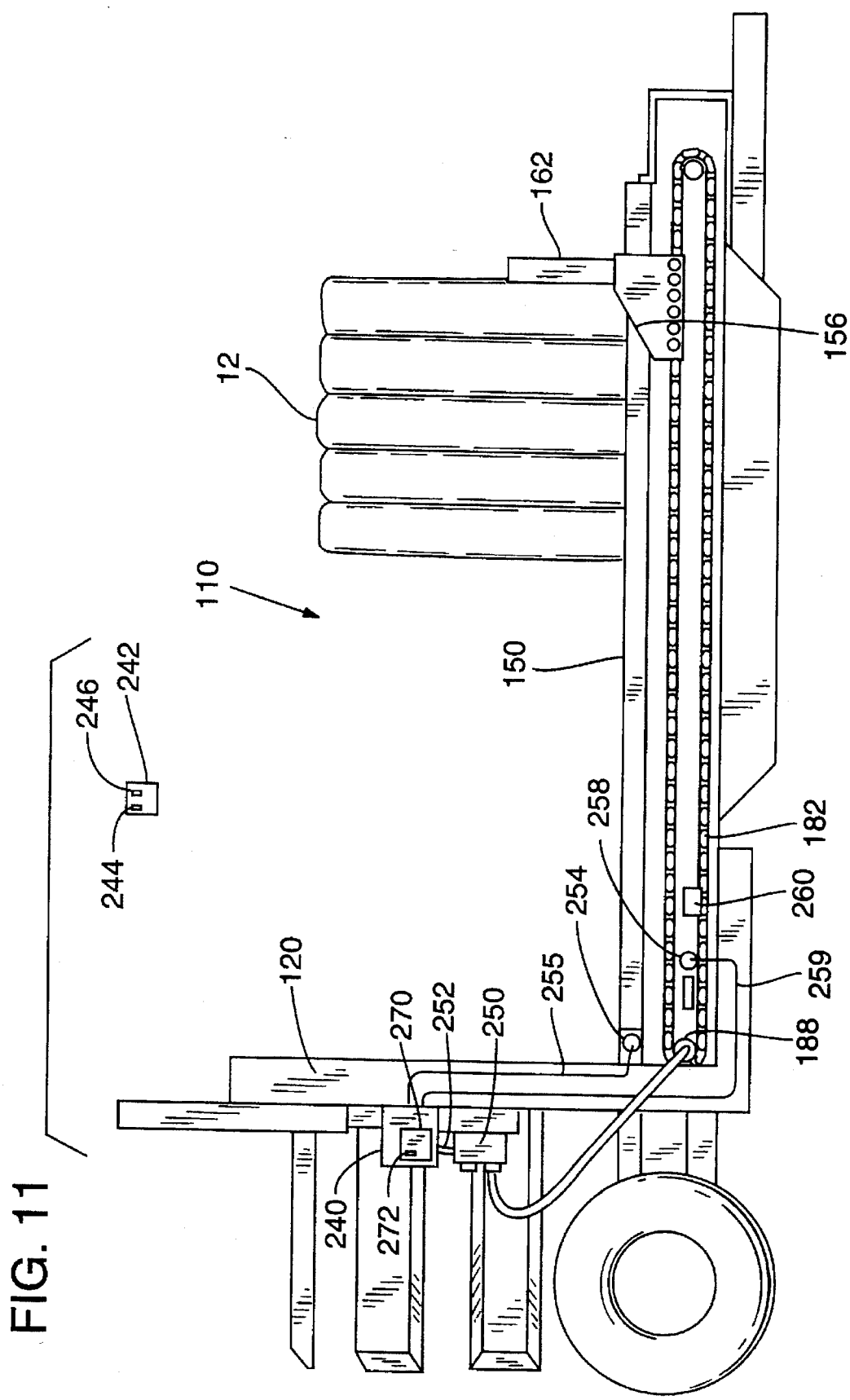
FIG. 11 illustrates a machine such as any of the disclosed machines but including a remote control feature.

FIG. 11 illustrates the machine 110 arranged to be operated by a remote control. The machine 110 has a remote control power unit 240 to control the movement of the bale pusher 162. The remote control power unit 240 is coupled to a hydraulic valve 250 by connecting line 252. In this embodiment the valve 250 is a solenoid operated valve and a self contained power unit 220 mounted on the machine 110 in a conventional manner (shown in FIGS. 6–9) provides the hydraulic (motive) power for the cylinders 126 and the motors 188. The valve 250 is also manually operable in the same manner as valves 226, 228 (FIGS. 6, 7 and 8), however, the operating lever is not illustrated in FIG. 11. The remote control power unit 240 is activated by a switch 272 on the machine mounted control panel 270. The remote control power unit 240 is controlled by a portable transmitter 242 that may be remote from the machine 110. It is contemplated that the transmitter 242 would be operable by an operator of a conventional loader which is utilized to load bales onto the cradle 150 of the machine 110. A single operator may thus operate the machine 110 to perform the bagging operation while operating the loader to place bales on the cradle 150 of the machine 110.

The transmitter 242 (shown enlarged in FIG. 11) is of the type that has push buttons or switches 244 and 246 to control the remote control power unit 240. Operation of switches 244, 246 will send a signal, such as a radio signal, to the remote control power unit 240. The remote control power unit 240 will, upon receiving the signal from the transmitter 242 (generated by depressing switch 244), operate the hydraulic control valve 250 to control one rotational direction of the hydraulic motors 188 to propel the bale pusher 162 toward the support member 120. Operation of switch 246 of the transmitter 242 will send a different signal to the remote control power unit 240 to operate the valve 250 to stop the motors 188 and thus stop the movement of the pusher 162. The switch 246 is thus utilized to interrupt the cycle of the pusher. The movement of the pusher 162 may be stopped at any time by depressing the switch 246. When the button 246 has been depressed to stop the pusher, switch 244 may be depressed to cause the pusher to continue its interrupted cycle. When the switch 246 has been depressed to stop the movement of the pusher 162, the switch 246 may be depressed again to reverse the direction of movement of the pusher 162.

A sensor 254, mounted on the machine 110 strategic to the bale pusher 162 will send a signal to the remote control power unit 240 via electrical line 255 when the front 256 of the bale pusher comes in close proximity to the sensor 254. The remote control power unit 240 will deactivate the valve 250 to stop the movement of the bale pusher 162 toward the support member 120 when the front 256 is in close proximity to sensor 254. The sensor 254 is positioned such that the bale pusher will be at or near its stroke limit when it transmits a signal to the remote control power unit 240. The remote control power unit is preferably arranged, upon activation by the signal of the sensor 254, to control the valve 250 to stop the movement of the bale pusher toward the support member 120 and then operate the valve 250 to control the rotational direction of the motors 188 to move the bale pusher 162 away from the support member 120 and toward the hitch end of the machine.

Another sensor 258 is mounted strategic to the travel path of a chain mounted mechanical stop 260. The stop is affixed to the chain 182 that propels the bale pusher 162. As the bale pusher 162 is moved toward the hitch end of the machine by movement of the chain 182, the stop 260 will come in close proximity to the sensor 258. When the stop 260 is in close proximity to the sensor 258, the sensor will send a signal, via electrical line 259 to the remote control power unit 240. The remote control power unit 240 will control the valve 250 to stop the movement of the bale pusher 162 toward the hitch end of the machine.

The remote control power unit 240 in conjunction with the remote control transmitter 242 and the position sensors 256, 258 provide the capability of operating the machine 110 unattended to perform the bagging operation. The pusher 162 is initially moved toward the hitch end of the machine. An operator of the conventional loader will for example, after depositing a bale (or bale unit) 12 on the cradle 150 of the machine, utilize the remote control transmitter 242 (i.e. switch 244) to control the movement of the bale pusher 162 toward the support member 120. When the front 256 of the bale pusher 162 is in close proximity to the sensor 254 the motion of the bale pusher will be stopped. This will place the bale 12 into the defined opening of the bag 14. The bale pusher 162 will then be retracted to the hitch end of machine and stopped under the control of the remote control power unit 240 enabling the operator to place another bale 12 on the cradle 150. After loading another bale 12 on the cradle 150, the operator will activate switch 244 to once again affect movement of the bale pusher 162 toward the support member 120 to move the bale into the defined opening of bag 14.

The overall width of the machine 110 is reduced for transport or packaging by simply removing all but one of the bolts that secures the paddles assemblies designated as #1 and #5 in FIG. 9 to the brackets 121. This permits pivoting the bracket end 128 downward which reduces the overall width of the machine 110. The bracket assemblies #1 and #5 are secured in their pivoted position by replacing the bolts in the bracket 121 which will secure the units in the pivoted position. It will be appreciated that other hold down equipment such as binding straps and the like may be utilized as well to hold the paddle assemblies #1 and #5 in the pivoted position. The machine 10 of FIG. 1 may be similarly arranged by fixedly attaching the sleeves 22 to the support 20 by removable fasteners such as bolts.

Figure 12:
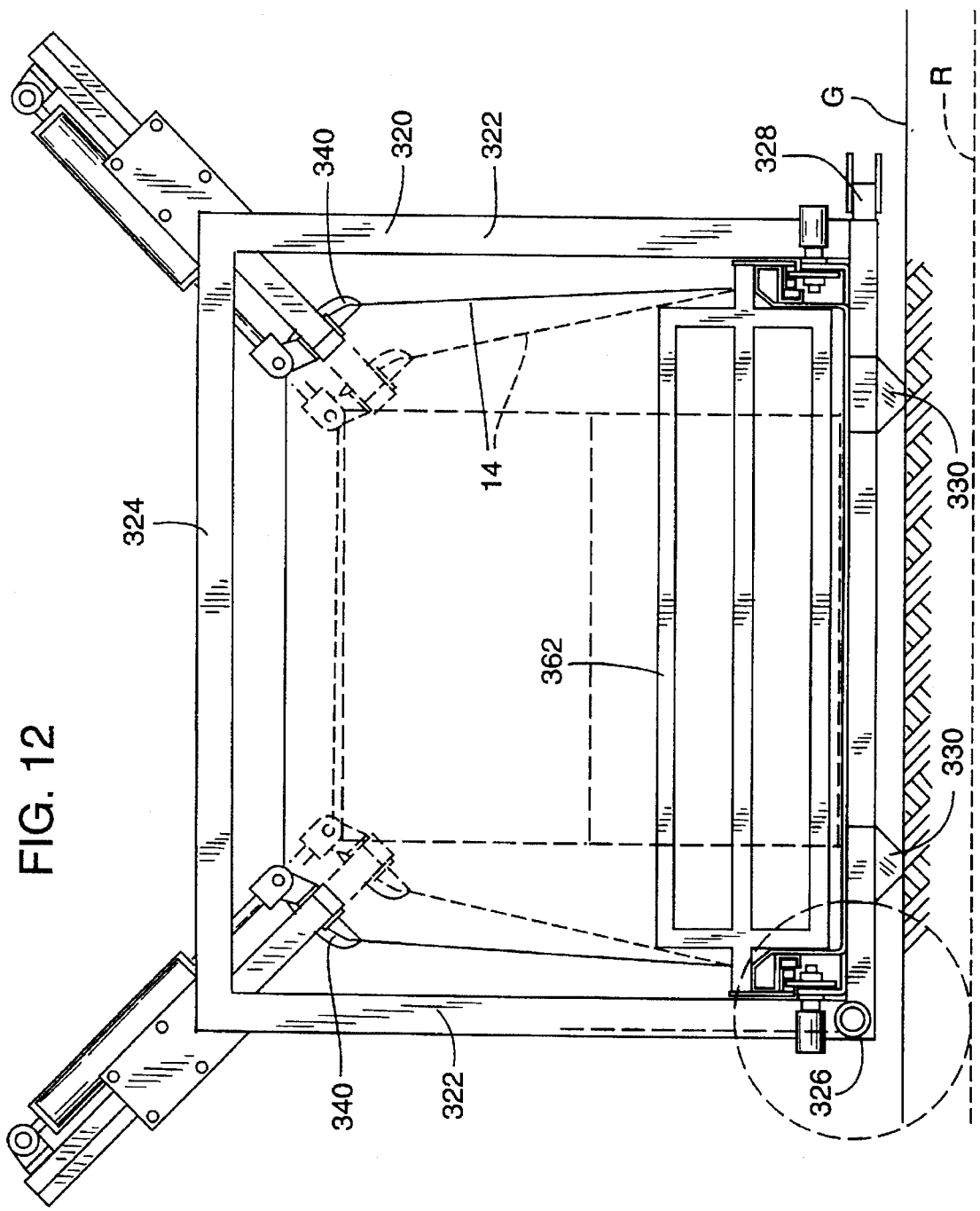
FIGS. 12, 13 and 14 are front and side views of an alternative embodiment adapted to multiple square bale bagging.
Figure 13:
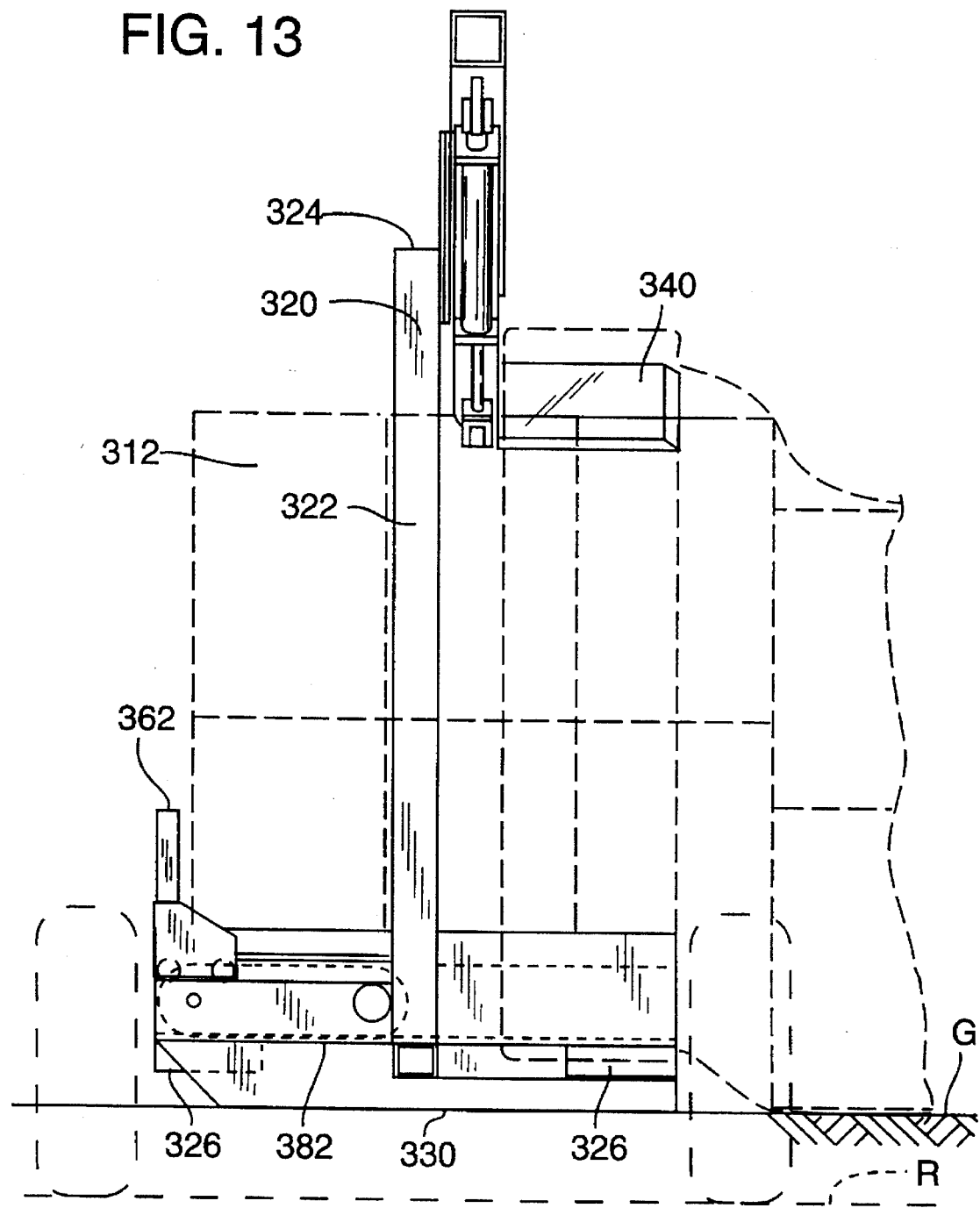
Figure 14:
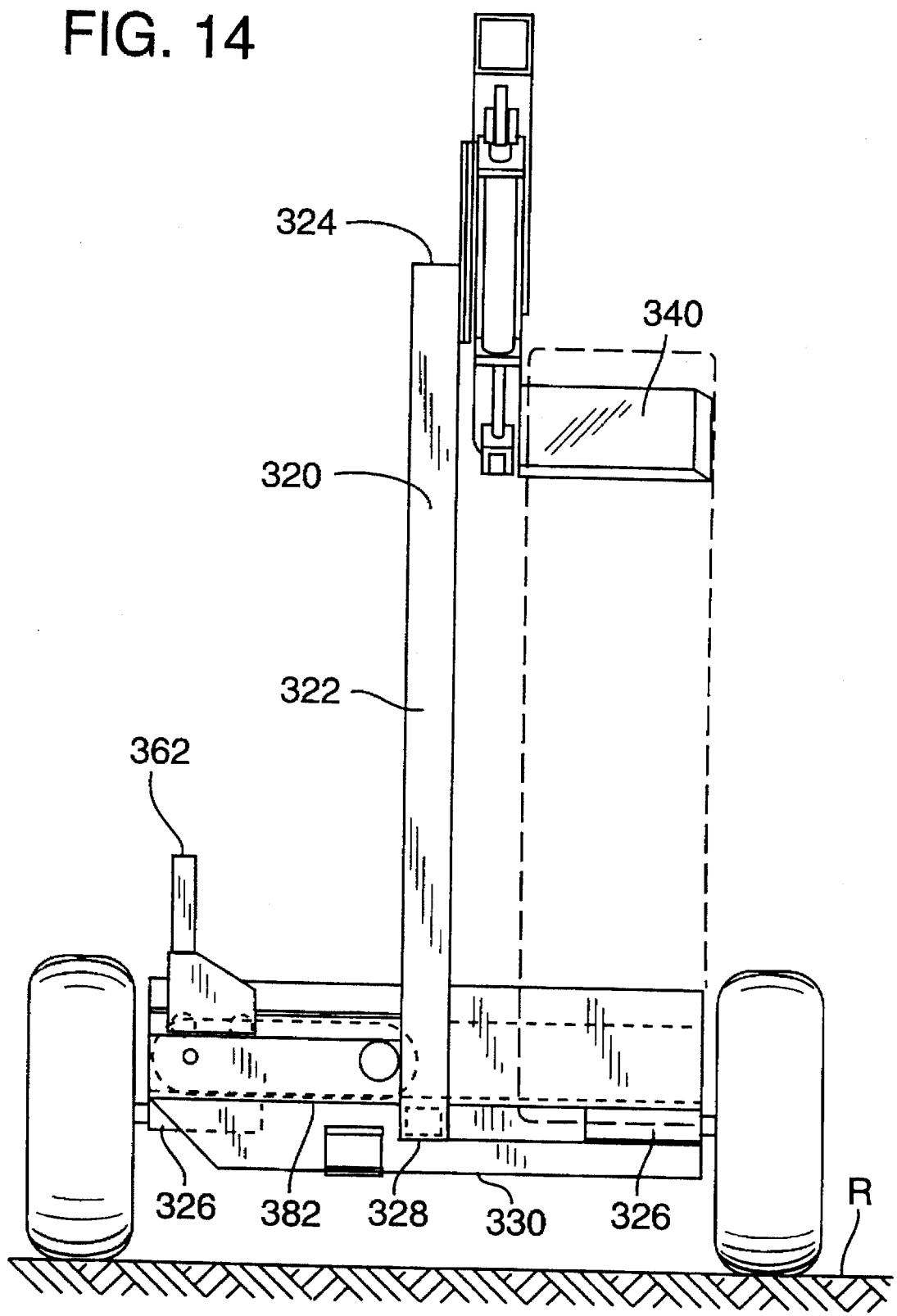

Whereas FIG. 9 illustrates the manner in which the bale bagger can be convertible as between round bale bagging and square bale bagging, FIGS. 12–14 are simplified versions of the machine designed specifically for bagging multiple square bales, i.e., having a two bale height and a two bale width (2×2). The machine of FIGS. 12–14 operates in most respects like that of FIG. 9 and the similar features will not be here described. The differences are primarily the elimination of mechanism not required for multiple square bale bagging. The support 320 is comprised of two vertical posts 322 and a horizontal connecting post 324. A bag stretching paddle 340 (and the actuating mechanism therefor) are mounted at the upper junctures of the vertical and horizontal posts. As illustrated in FIG. 12, the paddles are extended inwardly as shown in dash lines to receive a bag 14. The bag is then stretched to the open square positions as illustrated in solid lines.

As indicated by FIG. 13, a primary difference is the length of the machine. The multiple bales 312 stacked two high and two wide require a large opening into the bag but the length of the bales are much shorter than a single larger square or single round bale of comparable cross section. The machine of FIGS. 12–14 is much easier to transport, e.g., over roads R by taking advantage of the short length, i.e., by mounting the wheels and tow bar for towing sideways. One side of the machine is provided with wheel sockets 326 and the other side is provided with a telescoping hitch 328.

As will be apparent from a comparison of FIGS. 12–14, with FIGS. 8 and 9, with the wheels removed from sockets 326, and the towing bar retracted into the frame, the machine is ready for the bag and loading thereof as substantially described for FIGS. 8 and 9. The bale ram is retracted, four stacked bales (2×2) are placed on the cradle and the ram is actuated (which may be by remote control as illustrated for FIG. 11) to shove the bales into a bag stretched to a desired open position as illustrated. The forcing of the bales into the bag (once anchored) causes the machine to move forward as resistively permitted by the skids 330 over the ground G.

Those skilled in the art will recognize that modifications and variations may be made without departing from the true spirit and scope of the invention. The invention is therefore not to be limited to the embodiments described and illustrated but is to be determined by the appended claims.

What is claimed is:

1. A bale bagging machine, comprising:
   a movable chassis;
   a support member extending from said chassis, said support member defining an opening;

multiple paddles movably mounted on said support member in a spaced relation, said paddles extending axially inwardly from said support member, said paddles movable to selected positions inward and outward in a substantially radial direction relative to said opening;

a cradle mounted on said chassis and extending from a bale receiving position into and through the defined opening of said support member, an end of said cradle extending axially from said support member to substantially at least the same distance as said paddles extend, said end of the cradle and said paddles in combination selectively forming a periphery of varied shades and an elastic bag surrounding said paddles and the end of said cradle and stretched thereby to the shape of said periphery;

said cradle configured with side portions spaced laterally apart to support and guide a bale having a rectangular shape, and one of said varied shapes configured as a rectangle to receive said bale of rectangular shape with side portions of the end of said cradle forming two lower corners and a pair of paddles forming two upper corners of the rectangle; and a bale pusher pushing bales received on said cradle to be guided by said cradle into the elastic bag.

2. A bale bagging machine as defined in claim 1, including:

tracking skids mounted on the chassis for maintaining the travel direction during the sheathing operation.

3. A bale bagging machine comprising:

a mobile chassis having a front end and rear end and movable in a forward direction;

a ring-like support defining an opening and an axis through the opening projected along the forward direction;

a feed cradle on the chassis extending from a bale receiving position adjacent the front end of the chassis and projected rearwardly to a rear end portion positioned through the bottom of the ring-like support, said feed cradle having a bottom support pan configured to have a flat bottom and bale restricting sides and as configured supporting and guiding both rectangular and round bales, and a bale pusher movably mounted on the cradle for pushing both round and square bales along the cradle; and multiple bag holding fingers mounted onto said frame for radial movement of the fingers relative to said frame, said bag holding fingers having independent movement and a control for providing said independent movement, and the end of said cradle extended through the frame and a pair of said fingers positioned on said support and movable by said control to a position whereby said cradle sides and said pair of fingers define corners of a rectangle to cooperatively hold a bag open for receiving a rectangular bale pushed by said bale pusher and guided by the sides of said cradle, said pair of fingers selectively movable by said control to an alternate position in cooperation with other of the fingers and the cradle configuration for holding a bag open to receive round shaped bale.

4. A bale bagging machine comprising:

a movable chassis;

a support member extending from said chassis, said support member defining an opening;

multiple paddles movably mounted on said support member in a spaced relation, said paddles extending axially inwardly from said support member, said paddles movable to selected positions inward and outward in a substantially radial direction relative to said opening;

a cradle mounted on said chassis and extending from a bale receiving position into and through the defined opening of said support member, an end of said cradle extending axially from said support member to substantially at least the same distance as said paddles extend, said end of the cradle and said paddles in combination selectively forming a periphery of varied shades and an elastic bag surrounding said paddles and the end of said cradle and stretched thereby to the shape of said periphery and defining thereby a bale receiving opening; and three of said paddles providing a top center paddle and opposed top side paddles adjacent to said top center paddle, and said cradle having defined sides, said top side paddles as selectively positioned and said cradle sides cooperatively defining corners of a rectangle, and said elastic bag supported by said top side paddles and said cradle sides to define a corresponding rectangular bale receiving opening for receiving a correspondingly rectangular bale, and a bale pusher for pushing said rectangular bale along said cradle to be guided by said cradle through said rectangular opening and into the elastic bad.

5. A bale bagging machine as defined in claim 3, further including:

a remote control coupled to the bale pusher for controlling movement of the bale pusher toward and away from said support.

6. A bale bagging machine comprising:

a movable chassis;

a support member extending from said chassis, said support member defining an opening having a center;

paddles movably mounted on said support member in a spaced relation, said paddles extending axially relative to said opening from said support member;

a feed cradle mounted on said chassis and extending through the defined opening of said support member, an end of said cradle extending axially from said support member to substantially at least the same distance as said paddles extend, said feed cradle in cooperation with said paddles forming a substantially rectangular periphery and an elastic bag surrounding said paddles and cradle and stretched thereby to the shape of said periphery; and said feed cradle dedicated in length and width to receiving and feeding rectangular bales, and said paddle being two in number and dedicated to rectangular bale bagging only.

7. A bale bagging machine as defined in claim 6 wherein said machine has a length dimension smaller than its width dimension, and said machine includes wheels and a tow bar removably provided and arranged on the chassis for towing the machine sideways.

* * * * *

UNITED STATES PATENT AND TRADEMARK OFFICE
CERTIFICATE OF CORRECTION

PATENT NO. : 5,628,168
DATED : May 13, 1997
INVENTOR(S) : Inman et al

It is certified that error appears in the above-indentified patent and that said Letters Patent is hereby corrected as shown below:

Col. 13, line 13, change "shades" to --shapes--.

Col. 14, line 30, change "bad" to --bag--.

Signed and Sealed this

Eighth Day of July, 1997

Attest:

BRUCE LEHMAN

*Attesting Officer*          *Commissioner of Patents and Trademarks*